(12) United States Patent
Kobayashi

(10) Patent No.: US 7,874,037 B2
(45) Date of Patent: Jan. 25, 2011

(54) WIPER SYSTEM

(75) Inventor: Fumio Kobayashi, Kiryu (JP)

(73) Assignee: Mitsuba Corporation, Kiryu-shi (JP)

( * ) Notice: Subject to any disclaimer, the term of this patent is extended or adjusted under 35 U.S.C. 154(b) by 953 days.

(21) Appl. No.: 11/724,491

(22) Filed: Mar. 14, 2007

(65) Prior Publication Data
US 2007/0240273 A1 Oct. 18, 2007

(30) Foreign Application Priority Data
Mar. 14, 2006 (JP) ............................ 2006-069022

(51) Int. Cl.
*B60S 1/06* (2006.01)
*B60S 1/18* (2006.01)

(52) U.S. Cl. ................ 15/250.31; 15/250.3; 296/96.17; 74/42

(58) Field of Classification Search ............... 15/250.3, 15/250.31, 250.27; 296/96.15, 96.17; 74/42, 74/43
See application file for complete search history.

(56) References Cited

U.S. PATENT DOCUMENTS

| | | | | |
|---|---|---|---|---|
| 5,203,602 A | * | 4/1993 | Eustache | 296/96.15 |
| 5,261,286 A | * | 11/1993 | Hayashi | 74/96 |
| 5,328,160 A | * | 7/1994 | McLaughlin | 267/141.3 |
| 5,956,800 A | | 9/1999 | Morin et al. | |
| 6,209,373 B1 | | 4/2001 | Muehlpforte et al. | |
| 6,237,185 B1 | * | 5/2001 | Goto et al. | 15/250.31 |
| 7,249,394 B2 | * | 7/2007 | Iwata | 15/250.27 |
| 2003/0042750 A1 | | 3/2003 | Muehlpforte et al. | |
| 2004/0049875 A1 | | 3/2004 | Metz | |

FOREIGN PATENT DOCUMENTS

| | | | |
|---|---|---|---|
| DE | 4409957 | * | 9/1995 |
| DE | 195 40 869 | | 6/1996 |
| EP | 1 291 254 | | 3/2003 |
| FR | 2 763 906 | | 12/1998 |
| JP | 2005-153878 | | 6/2005 |

OTHER PUBLICATIONS

Patent Abstracts of Japan, First Publication No. 2005-153878, Jun. 16, 2005, and English translation of the abstract.
European Patent Office, European Search Report, Oct. 6, 2009, from related European application No. 07005173.5.

* cited by examiner

*Primary Examiner*—Gary K Graham
(74) *Attorney, Agent, or Firm*—Kenyon & Kenyon LLP

(57) ABSTRACT

A wiper system includes a motor bracket to which a wiper motor is fixed, and the motor bracket is fixed to a body with a rubber pad therebetween. A mounting leg made of a hard material extends from a first pivot holder that supports a first pivot shaft, and is directly fixed to the body. Mounting legs made of a hard material extend from a second pivot holder that supports a second pivot shaft, and are directly fixed to the body. According to the wiper system, it is possible to prevent vibration due to a wiper motor from being transferred to the body and a wiper arm from overrunning.

3 Claims, 3 Drawing Sheets

WIPER SYSTEM

CROSS REFERENCE TO RELATED APPLICATION

This application claims priority from Japanese Patent Application No. 2006-69022 filed on Mar. 14, 2006, the disclosure of which is incorporated by reference in its entirety.

BACKGROUND OF THE INVENTION

1. Field of the Invention

The present invention relates to a wiper system that cleans glass surfaces of a vehicle.

2. Description of the Related Art

Wiper systems for vehicles each have a pivot shaft that rotates by a wiper motor and cleans glass surfaces with a wiper blade at an end of a wiper arm by pivoting the wiper arm fixed to the pivot shaft.

A bracket that rotatably supports the pivot shaft has mounting legs that are fixed to the body and rubber pads are provided to fixing holes formed at the mounting legs. A collar is fitted in the rubber pad and the wiper system is fixed to the body by inserting a bolt in a through hole formed in the collar. Surfaces of the rubber pads directly contact with the body, and the frame of the wiper system is supported against the body with a floating manner through the rubber pads (e.g. see Japanese Patent Application, First Publication No. 2005-153878). According to such a wiper system, because vibration that is generated by a wiper motor in operation is absorbed by the rubber pads, it is not transferred to the body.

However, in the wiper system, the rubber pad elastically deforms due to the pivoting of the wiper arm, causing the pivot shaft to be displaced. The displacement of the pivot shaft causes the wiper arm to overrun, which is a factor that deteriorates the effect of cleaning.

The invention was achieved in consideration of the above problems and it is an object of the invention to prevent vibration due to a wiper motor being transferred to the body and to prevent a wiper arm from overrunning by preventing displacement of a pivot shaft.

SUMMARY OF THE INVENTION

According to a first aspect of the invention, a wiper system includes a motor, a link mechanism that transmits a rotational force of the motor, a pivot shaft having a first end to which the link mechanism is connected and a second end to which a wiper arm is fixed, a pivot holder that rotatably supports the pivot shaft, a frame member that is attached to the pivot holder, and a motor bracket that is attached to the frame member and to which the motor is fixed. A first mounting leg part made of a hard material that is fixed to a body is formed at the pivot holder, a second mounting leg part made of a hard material that is fixed to the body is formed at the motor bracket, and the first mounting leg part is directly fixed to the body and the second mounting leg part is fixed to the body through an elastic member.

According to the above wiper system, because the motor bracket, where the motor is fixed, is supported against the body through elastic members, vibration generated from the motor, in vibration while the wiper system operates, is absorbed into the elastic members and not transferred to the body. Meanwhile, a portion of the wiper system that includes the pivot shaft is directly fixed to the body through the first mounting leg part, so that it is possible to prevent vibration (displacement) at the pivot shaft. Therefore, it is possible to prevent the wiper arm from overrunning.

According to a second aspect of the invention, in the wiper system, contact parts that contact with the body are formed in a convex shape at the second mounting leg part.

According to the above wiper system, because a convex portion is formed at the portion for fixing the second pivot holder, apart from the motor, and the contact area with the body is made small, it is difficult for vibration due to the wiper in operation to be transferred to the body.

According to a third aspect of the invention, the pivot holder in the wiper system is mounted at a first end of the frame member that is disposed substantially parallel with a glass surface, and the motor bracket is mounted at a second end of the frame member.

According to the above wiper system, even though the first mounting leg part is directly fixed to the body, it is difficult for vibration of the motor to be transferred to the body because the portions that are fixed to the body through the elastic members and the portions that are directly fixed to the body are apart from each other.

According to a fourth aspect of the invention, in the wiper system according to the third aspect of the invention, the pivot holder has a first pivot holder that rotatably supports a first pivot shaft and a second pivot holder that rotatably supports a second pivot shaft, the frame member has a first frame member and a second frame member that is fixed to a second end of the first frame member, the first frame member is integrally formed at a first end with the motor bracket and the second mounting leg part and mounted at the second end with the first pivot holder and a third mounting leg part made of a hard material that is used for fixing the first pivot holder to the body, and the second pivot holder and the first mounting leg part are mounted to the second frame member.

The above wiper system has two pivot shafts and they are disposed apart from the motor bracket. Vibration of the pivot shafts is prevented and vibration due to the motor is prevented from being transferred to the body, by the first mounting leg and the third mounting leg. Further, it is facilitated to manufacture the wiper system.

DESCRIPTION OF THE PREFERRED EMBODIMENTS

A preferred embodiment of the invention is described hereinafter with reference to the accompanying drawings.

Figure 1:
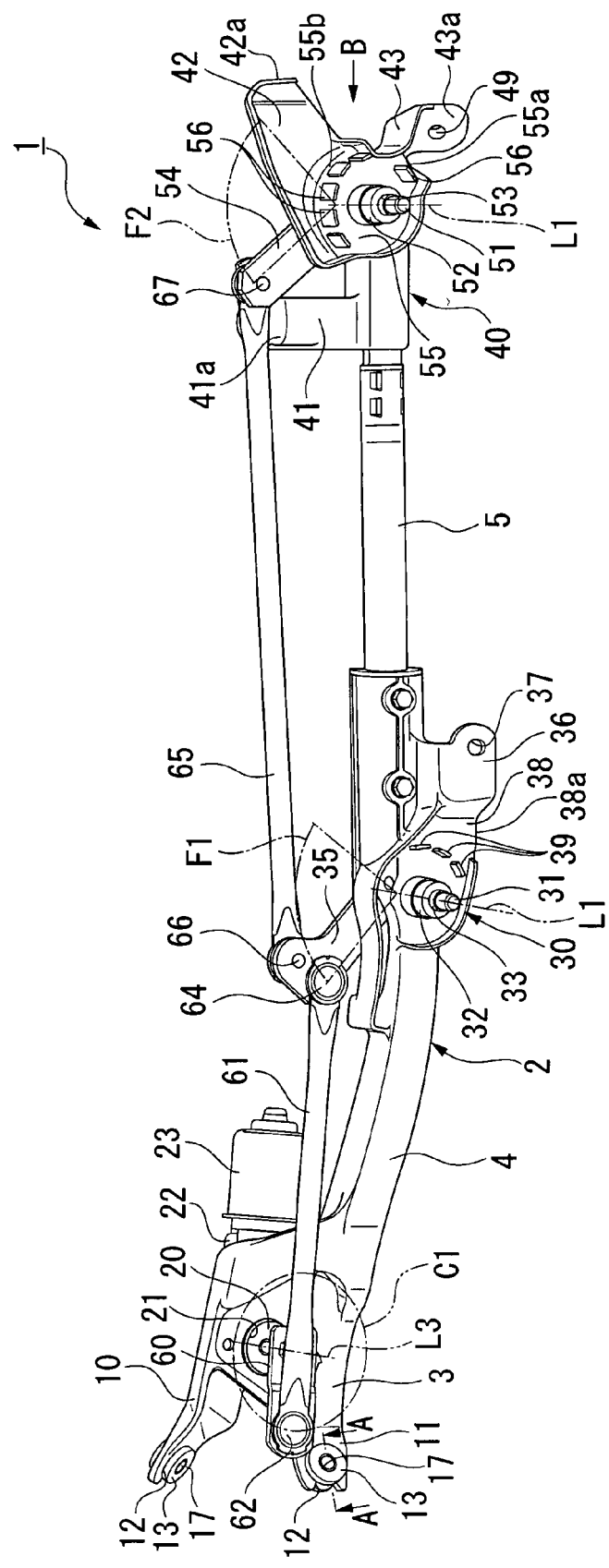
FIG. 1 is a front view illustrating the configuration of a wiper system according to an embodiment of the invention.
Figure 2:
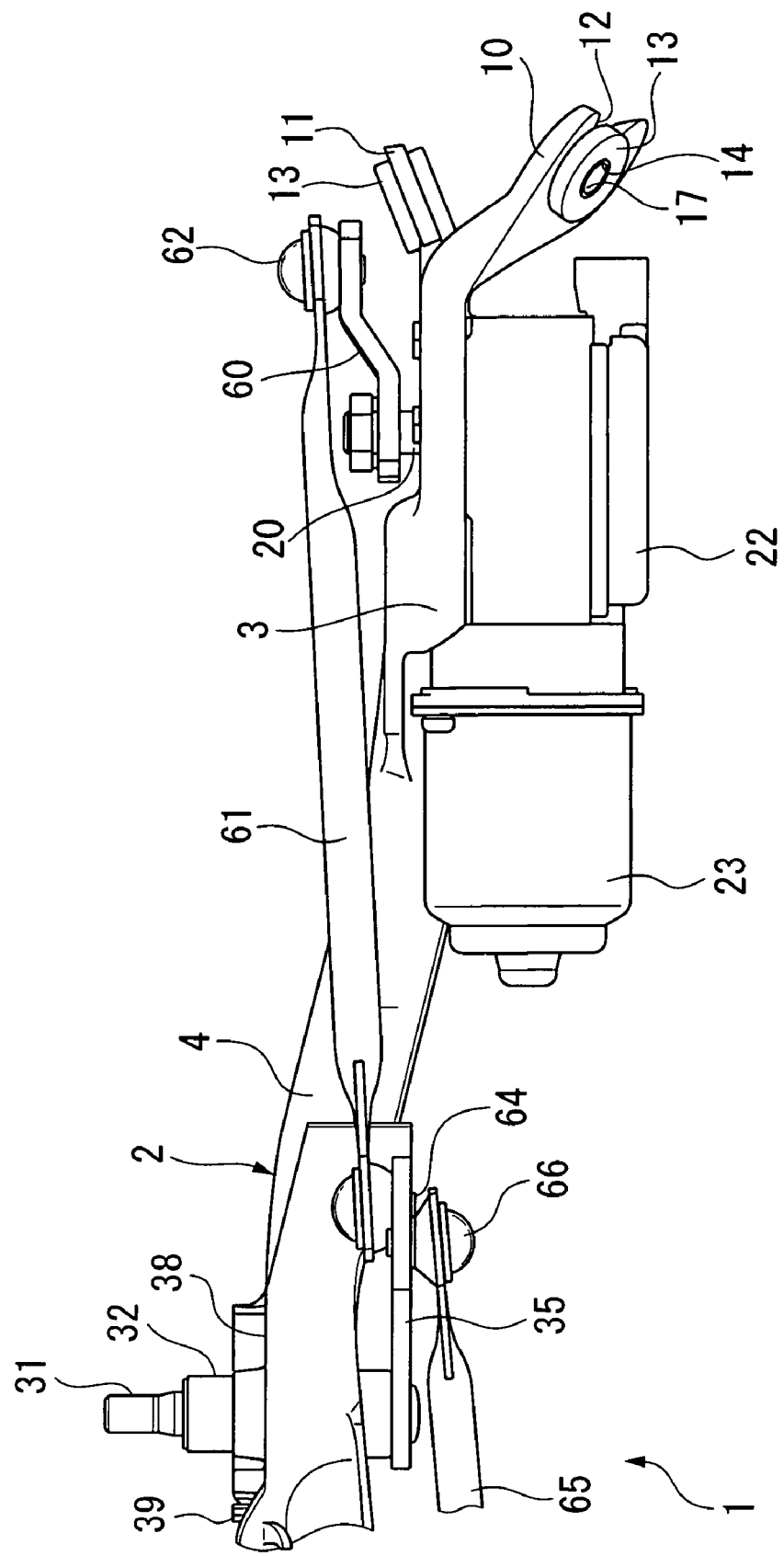
FIG. 2 is a side view of the wiper system, showing the vicinity of a motor bracket.

The overall configuration of a wiper system is shown in FIGS. 1 and 2. The wiper system 1 has an elongated frame 2 of a metal such as aluminum. The frame 2 is composed of a frame member 4 (first frame member) having a first end with a motor bracket 3 integrally formed that is fixed to the body and a pipe member 5 (second frame member) that is fixed to a second end of the frame member 4 by a bolt. The frame 2 is preferably formed of a member.

Figure 3:
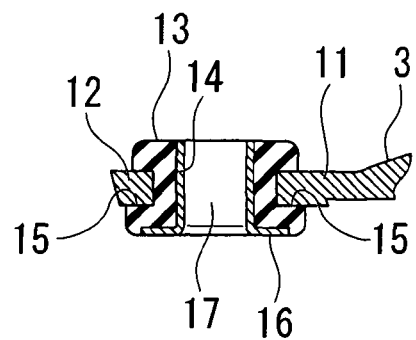
FIG. 3 is a cross-sectional view taken along the line A-A of FIG. 1.

Two mounting legs 10, 11 (second mounting leg part) integrally extend from the motor bracket 3, taking the shape of the body. A slit 12 is formed at each mounting leg 10, 11 and a rubber pad 13 is inserted in each slit 12. As shown in FIG. 3, the rubber pad 13 has a through hole 14 at the center and a fitting groove 15 around the outer circumference in a concave ring shape, and the fitting groove 15 is fitted into the periphery of the slit 12. A collar 16 is press-fitted in the through hole 14 of the rubber pad 13. The collar 16 is formed into a cylinder with a through hole 17, into which a bolt can be inserted, and a radially extending flange at a first end.

Further, a through hole 21 where a driving shaft 20 is rotatably inserted is formed in the motor bracket 3. The driving shaft 20 is supported by a decelerator 22 that is screwed to the rear side of the motor bracket 3, and connected through a decelerating mechanism to an output shaft (not shown) of a wiper motor 23 fixed to the cover for the decelerator 22. The decelerator 22 is configured such that as the output shaft of the wiper motor 23 rotates, the driving shaft 20 rotates at a predetermined reduction ratio.

A first pivot holder 30 is integrally formed at the second end of the frame member 4. A shaft support 32 for a first pivot shaft 31 is formed on the first pivot holder 30. The shaft support 32 is formed by bulging a portion of the first pivot holder 30 and has a through hole 33. In the through hole 33, a bush (not shown) is press-fitted and then the first pivot shaft 31 is rotatably inserted. The free end and base end of the first pivot shaft 31 protrude from the shaft support 32. The base end of the wiper arm is fixed by a bolt etc. to the free end of the first pivot shaft 31 that protrudes from the front side of the first pivot holder 30. The wiper arm cleans the driver's seat side of the windshield. A first end of a first driving lever 35 is fixed to the base end of the first pivot shaft 31 that protrudes from the rear side of the first pivot holder 30. The first driving lever 35 extends substantially perpendicular to the axial line L1 of the first pivot shaft 31.

Further, a mounting leg 36 (third mounting leg part) that is fixed to the body integrally extends from the first pivot holder 30. A fixing hole 37 to insert a bolt therein is formed through the mounting leg 36.

A drain part 38 is formed at the first pivot holder 30 to discharge rain flowing along the wiper arm. The drain part 38 has a drain hole 38a that is positioned at a predetermined inclination downward after the wiper system 1 is mounted to the body. A plurality of ribs 39 are formed between the shaft support 32 for the first pivot shaft 31 and the drain hole 38a and prevents the drain hole 38a from being clogged up with dead leaves, etc.

Figure 4:
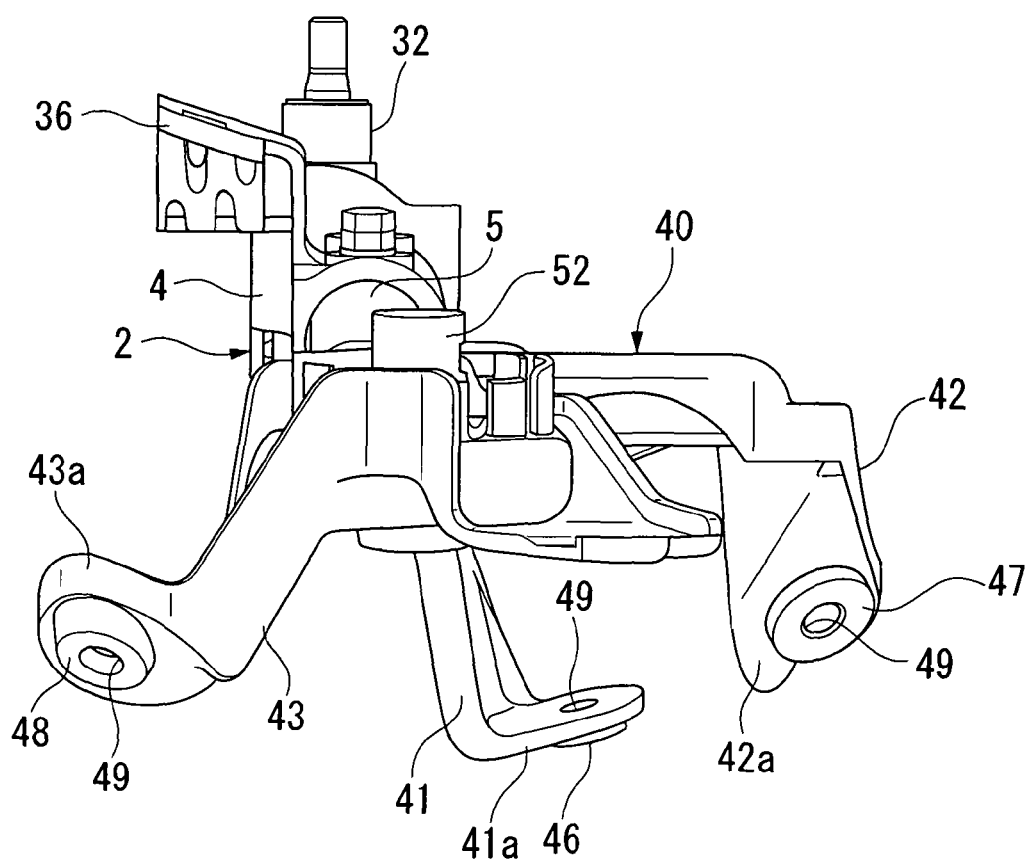
FIG. 4 is a view seen from the direction of arrow B of FIG. 1 before a pivot shaft and a parallel link are attached.

A second pivot holder 40 that is fixed to the body is attached to a first end of the pipe member 5. The second pivot holder 40 is a metallic member that is separate from the pipe member 5, but it may be integrally formed with the pipe member 5. As shown in FIGS. 1 and 4, three mounting legs 41, 42, 43 (first mounting leg part) are integrally formed with the second pivot holder 40, extending from it.

The free ends 41a, 42a, 43a of the mounting legs 41, 42, 43 are bent corresponding to the shape of body. Convex contact parts 46, 47, 48 are formed at the free ends 41a, 42a, 43a, respectively. A fixing hole 49 is formed at each of the free ends 41a, 42a, 43a, substantially passing through the center of the contact parts 46, 47, 48. FIG. 4 is a view before a pivot shaft and a parallel link are mounted (described later).

A shaft support 52, into which a second pivot shaft 51 is inserted, is formed in the second pivot holder 40. The shaft support 52 is formed by bulging a portion of the second pivot holder 40 and has a through hole 53. In the through hole 53, a bush (not shown) is press-fitted and then the second pivot shaft 51 is rotatably inserted. The free end and base end of the second pivot shaft 51 protrude from the shaft support 52. The base end of the wiper arm is fixed by a bolt, etc. to the free end of the second pivot shaft 51 that protrudes from the front side of the second pivot holder 40. The wiper arm cleans the passenger seat side of the windshield. A first end of a second driving lever 54 is fixed to the base end of the second pivot shaft 51 that protrudes from the rear side of the second pivot holder 40. The second driving lever 54 extends substantially perpendicular to the axial line L2 of the second pivot shaft 51.

A drain part 55 is formed at the second pivot holder 40 to discharge rain flowing along the wiper arm. The drain part 55 has drain holes 55a, 55b that are positioned at a predetermined inclination downward after the wiper system 1 is mounted onto the body. A plurality of ribs 56 are formed between the shaft support 52 for the second pivot shaft 51 and the drain holes 55a, 55b and prevent the drain hole 55a, 55b from being clogged up with dead leaves etc.

The axial line L3 of the driving shaft 20 is substantially parallel with the axial lines L1, L2 of the pivot shafts 31, 51. A crank arm 60 is fixed at a first end to the free end of the driving shaft 20 protruding from the front side of the motor bracket 3. The crank arm 60 extends substantially perpendicular to the axial line L3 of the driving shaft 20 and is rotatably connected at a second end to a first end of a connecting rod 61 by a ball joint 62. The connecting rod 61, an elongated member, extends across the curved portion of the frame member 4 and is rotatably connected at a second end to a second end of the first driving lever 35 by a ball joint 64. A ball joint 66 is provided at the second end of the first driving lever 35, closer to the second pivot holder 40 than the ball joint 64. A first end of a link rod 65 is rotatably connected to the second end of the first driving lever 35 through the ball joint 66. The link rod 65, an elongated member, is rotatably connected at a second end to the second end of the second driving lever 54 through a ball joint 67. As described above, a link mechanism, a parallel link, consists of the driving levers 35, 54 and the link rod 65.

The operation of the present embodiment is described below.

A plurality of fixing holes formed at the body is used to fix the wiper system 1 to the body (not shown). The motor bracket 3 of the wiper system 1 is fixed by arranging the through hole 17 of the collar 14 inserted in the rubber pad 13 of the mounting legs 10, 11 with the fixing hole at the driver's seat side of the vehicle, and then inserting a bolt into the holes. The mounting leg 36 of the first pivot holder 30 is fixed to the passenger seat side through the fixing hole 49, in surface-contact with the body. The mounting legs 41 to 43 of the second pivot holder 40 are fixed to the body by fastening bolts into corresponding fixing holes 49, in which only the contact parts 46 to 48 are in metallic surface contact with the body and the other portions do not contact with the body. When the wiper system 1 is fixed to the body as described above, the first pivot shaft 31 is centrally positioned in the width direction of the body and the second pivot shaft 51 is positioned to the passenger seat side from the center in the width direction of the body.

To clean the windshield, the output shaft of the wiper motor 23 is rotated. The output shaft rotates the driving shaft 20 through the decelerating mechanism and the crank arm 60 fixed to the driving shaft 20 correspondingly pivots on the driving shaft 20. A first end of the crank arm 60 rotates along a virtual circle C1. Since the connecting rod 61 rotatably connected by the ball joint 62 to the second end of the crank arm 60 is also connected to the first driving lever 35 of the parallel link, the rotation of the driving shaft 20 (motion along the virtual circle C1) is converted into a linear motion of the connecting rod 61.

The first driving lever 35 pivots on the first pivot shaft 31 along a virtual curve F1 with a predetermined angle by the linear motion of the connecting rod 61. As a result, the first pivot shaft 31 fixed to the first driving lever 35 rotates and the wiper arm fixed to the first pivot shaft 31 pivots within a predetermined range of angle, which cleans the driver's seat side of the windshield.

Similarly, as the connecting rod 61 linearly moves, the second driving lever 54 connected to the connecting rod 61 through the link rod 65 pivots on the second pivot shaft 51 along a virtual curve F2 with a predetermined angle. As a result, the second pivot shaft 51 fixed to the second lever 54 rotates and the wiper arm fixed to the second pivot shaft 51 pivots within a predetermined range of angle, which cleans the passenger seat side of the windshield.

Vibration generated from the wiper motor 23 in the above operation is transferred to the motor bracket 3. Since the motor bracket 3 is supported against the body through the rubber pads 13, the vibration is absorbed as elastic deformation into the rubber pads 13. As the rubber pads 13 elastically deform, the motor bracket 3 may slightly moves relative to the body. For this reason, since the mounting leg 36 of the first pivot holder 30 is fixed in direct contact with the body, it does not move and the first pivot shaft 31 does not move accordingly. Therefore, the wiper arm fixed to the first pivot shaft 31 does not overrun. Similarly, since the contact parts 46 to 48 of the mounting legs 41 to 43 are fixed in direct contact with the body, they do not move and the second pivot shaft 51 does not move. Consequently, the wiper arm does not overrun.

According to the embodiment, while vibration caused by the wiper motor 23 is not transferred to the body by support of the wiper motor 23, the main source of vibration when the wiper system 1 is in operation, against the body through the rubber pads 13, the pivot shafts 31, 51 are directly fixed to the body through the elastic members, so that the pivot shafts 31, 51 do not displace. Accordingly, the wiper arms attached to the pivot arms 31, 51 do not overrun, and for example, it is possible to prevent the wiper blade at the end of the wiper arm from interfering with the pillar formed at the edge of the windshield, which maintains the stability of the cleaning performance. Further, for the mounting legs 41 to 43 of the second pivot holder 40, since the contact area of the contact parts 46 to 48 with the body is made small, vibration due to the wiper arm in pivot is practically not transferred to the body.

The invention is not limited to the above embodiment and may be modified in a variety of ways.

For example, the rubber pads 13 are elastic members commonly known in the art, but not limited thereto.

The mounting legs 10, 11, 36, 41 to 43 may be formed separate from corresponding brackets 3, 30, 40. Further, the mounting legs 36, 41 to 43 may be preferably made of a hard material that is substantially 0 in elastic deformation and is not limited to metal. The contact part of the mounting leg 36 of the first pivot holder 30 may be formed in a convex shape.

Further, it may be preferable to fix the first pivot holder and the second pivot holder to both ends of the pipe member, respectively, and dispose the motor which acts as a vibration source, between the first and second pivot holders. As for such a configuration, the first pivot holder and the second pivot holder are directly fixed to the body and the motor is fixed through an elastic member, in which the same effects can be achieved.

Other than the above configurations, addition, removal, displacement, and modification may be possible in the configurations without departing from the scope of the invention. The invention is not limited to the above description and limited only to the accompanying claims.

What is claimed is:

1. A wiper system comprising:
   a motor;
   a link mechanism that transmits rotational force of the motor;
   pivot shafts that each has a first end to which the link mechanism is connected and a second end to which a wiper arm is fixed;
   pivot holders that rotatably support the pivot shafts;
   a frame member that is attached to the pivot holders; and
   a motor bracket that is attached to the frame member and to which the motor is fixed, wherein:
   first mounting legs, which are made of a hard material and have conversely shaped, non-elastic contact part projecting laterally therefrom, so as to surface-contact with a body, are formed at one of the pivot holders,
   second mounting legs part made of a hard material are formed at the motor bracket, and
   the first mounting legs are directly fixed to the body via engagement of the contact parts therewith and the second mounting legs are fixed to the body through an elastic member.

2. The wiper system according to claim 1, wherein the pivot holders are mounted at a first end of the frame member and the motor bracket is mounted at a second end of the frame member.

3. The wiper system according to claim 2, wherein the pivot holders have a first pivot holder that rotatably supports a first pivot shaft and a second pivot holder that rotatably supports a second pivot shaft,
   the frame member has a first frame member and a second frame member that is fixed to a second end of the first frame member,
   the first frame member is integrally formed at a first end thereof with the motor bracket and the second mounting legs, and at the second end thereof with the first pivot holder and a third mounting leg made of a hard material that is used for fixing the first pivot holder to the body, and
   the second pivot holder and the first mounting legs are mounted onto the second frame member.

* * * * *